US012667139B2

(12) United States Patent
Liu et al.

(10) Patent No.: US 12,667,139 B2
(45) Date of Patent: Jun. 30, 2026

(54) AEROSOL-PRODUCING DEVICE AND CONTROL METHOD

(71) Applicant: SHENZHEN FIRST UNION TECHNOLOGY CO., LTD., Shenzhen (CN)

(72) Inventors: Shenhui Liu, Shenzhen (CN); Zhongli Xu, Shenzhen (CN); Yonghai Li, Shenzhen (CN)

(73) Assignee: SHENZHEN FIRST UNION TECHNOLOGY CO., LTD., Shenzhen (CN)

( * ) Notice: Subject to any disclaimer, the term of this patent is extended or adjusted under 35 U.S.C. 154(b) by 1091 days.

(21) Appl. No.: 17/755,442

(22) PCT Filed: Oct. 30, 2020

(86) PCT No.: PCT/CN2020/125355
§ 371 (c)(1),
(2) Date: Apr. 29, 2022

(87) PCT Pub. No.: WO2021/083343
PCT Pub. Date: May 6, 2021

(65) Prior Publication Data
US 2024/0032605 A1 Feb. 1, 2024

(30) Foreign Application Priority Data
Oct. 31, 2019 (CN) ......................... 201911054975.1

(51) Int. Cl.
*A24F 40/57* (2020.01)
*A24F 40/20* (2020.01)
(Continued)

(52) U.S. Cl.
CPC .............. *A24F 40/57* (2020.01); *A24F 40/20* (2020.01); *A24F 40/465* (2020.01); *A24F 40/51* (2020.01); *H05B 6/06* (2013.01)

(58) Field of Classification Search
CPC .......... A24F 40/20; A24F 40/40; A24F 40/51; A24F 40/57; H05B 6/06
See application file for complete search history.

(56) References Cited

U.S. PATENT DOCUMENTS 12,004,566 B2 * 6/2024 Korus ................... A24F 40/465
2018/0090923 A1 * 3/2018 Li ....................... B05B 17/0615
2021/0093008 A1 * 4/2021 White ............... H02M 3/33571

FOREIGN PATENT DOCUMENTS

CN 203563223 U 4/2014
CN 104180403 A 12/2014
(Continued)

OTHER PUBLICATIONS

Prior art reference CN_106304449 (English translation) published Jan. 4, 2017 (Year: 2017).*

*Primary Examiner* — Ibrahime A Abraham
*Assistant Examiner* — Joe E Mills, Jr.
(74) *Attorney, Agent, or Firm* — Proi Intellectual Property US

(57) ABSTRACT

Proposed by the present application are an aerosol-producing device and a control method therefor. The device comprises: an inductance coil for generating a changing magnetic field; a capacitor, which forms an LC oscillator with the inductance coil; and a susceptor, which is penetrated by the changing magnetic field to generate heat. A PFM inverter driving module drives the LC oscillator to oscillate so as to make the inductance coil generate the changing magnetic field, and comprises: a bridge circuit and a PFM controller, wherein the PFM controller outputs a PFM signal to the
(Continued)

bridge circuit so as to drive the bridge circuit to turn on or off so as to make the LC oscillator oscillate.

10 Claims, 4 Drawing Sheets

(51) Int. Cl.

| | |
|---|---|
| ***A24F 40/465*** | (2020.01) |
| ***A24F 40/51*** | (2020.01) |
| ***H05B 6/06*** | (2006.01) |

(56) References Cited

FOREIGN PATENT DOCUMENTS

| | | | |
|---|---|---|---|
| CN | 204201960 | U | 3/2015 |
| CN | 108348011 | A | 7/2018 |
| CN | 109952039 | A | 6/2019 |
| CN | 110025048 | A | 7/2019 |
| CN | 110101118 | A | 8/2019 |
| WO | 2018178113 | A2 | 10/2018 |
| WO | 2018178114 | A2 | 10/2018 |
| WO | 2019122097 | A1 | 6/2019 |
| WO | 2019129844 | A1 | 7/2019 |

* cited by examiner

AEROSOL-PRODUCING DEVICE AND CONTROL METHOD

CROSS REFERENCE TO RELATED APPLICATION(S)

This application claims priority to Chinese Patent Application No. 2019110549751, entitled "Aerosol-producing device and control method" and submitted to China National Intellectual Property Administration on Oct. 31, 2019, the entire contents of which are incorporated herein by reference.

TECHNICAL FIELD

The present disclosure relates to the technical field of heating and nonburning smoking sets, and in particular to an aerosol-producing device and a control method.

BACKGROUND

Tobacco products (e.g., cigarettes, cigars, etc.) are burning tobaccos to produce tobacco smoke during use. People attempt to make products that release compounds without burning so as to replace the tobacco products burning tobaccos.

An example of this kind of products is a heating device, which heats rather than burns a material to release compounds, for example, the material may be a tobacco product or other non-tobacco products which may contain or not contain nicotine.

In an embodiment of the above heating device of the existing technology, the patent application No. 201780070293.2 discloses an induction heating device for heating special tobacco products by electromagnetic induction, which employs a PWM (Pulse Width Modulation) inverter to convert a DC current output from a power supply into an alternating current to supply to an inductance coil, so that the inductance coil oscillates to form an alternating current and thus generate an alternating magnetic field to induce a susceptor to generate heat to heat a cigarette. For the induction heating device in the above embodiment, the oscillation frequency required by the inductance coil is varying in different heating stages of the working process, so that there is some difference between the induction heating efficiency and the required heating efficiency in the condition of the PWM inverter, and it is impossible to maintain an appropriate power output in different heating stages.

SUMMARY

In order to solve the problem in the prior art that the difference in frequency between the inverter output and the LC oscillator of the induction heating device causes loss, the embodiment of the present disclosure provides an aerosol-producing device with frequency conversion capability and a control method therefor.

Based on the above aim, one embodiment of the present disclosure provides an aerosol-producing device, configured to heat a smokable material to generate an aerosol, including:

- a chamber, which is configured to receive at least part of a smokable material;
- an inductance coil, which is configured to generate a changing magnetic field;
- a capacitor, which is configured to form an LC oscillator with the inductance coil;

- a susceptor, which is configured to be penetrated by the changing magnetic field to generate heat, thereby heating the smokable material to generate an aerosol;
- a PFM inverter driving module, which is constructed as an integrated circuit and includes:
- a bridge circuit, which is coupled to the LC oscillator; and
- a PFM controller, which is configured to output a PFM signal to the bridge circuit to drive the LC oscillator to oscillate, thereby causing the inductance coil to generate the changing magnetic field.

In a preferred embodiment, the PFM controller is configured to output a PFM signal to the bridge circuit according to a predetermined temperature.

In a preferred embodiment, the aerosol-producing device further includes a temperature sensor, which is configured to sense an operating temperature of the susceptor, wherein

- the PFM controller is configured to output a PFM signal to the bridge circuit according to the operating temperature of the susceptor.

In a preferred embodiment, the PFM controller is configured to output a PFM signal to the bridge circuit according to at least one of a relative magnetic permeability, a magnetic susceptibility or a real-time inductance value of the susceptor.

In a preferred embodiment, the PFM controller is configured to output a PFM signal to the bridge circuit according to a resonance frequency of the LC oscillator.

In a preferred embodiment, the resonance frequency of the LC oscillator is determined according to the following formula:

$f=1/2\pi(L_lC)^{1/2}$, where f represents the resonance frequency of the LC oscillator, $L_l$ represents an inductance value of the inductance coil including the susceptor, and C represents a capacitance value of the capacitor.

In a preferred embodiment, the aerosol-producing device further includes a frequency detection module, which is configured to detect an oscillation frequency of the LC oscillator, wherein

- the PFM controller is configured to output a PFM signal to the bridge circuit according to a detection result of the frequency detection module.

In a preferred embodiment, the frequency detection module is configured to detect an oscillation frequency of the LC oscillator by monitoring a change of voltage or current of the LC oscillator.

In a preferred embodiment, the frequency detection module is configured to detect an oscillation frequency of the LC oscillator by monitoring a change of the magnetic field generated by the inductance coil in the LC oscillator.

In a preferred embodiment, the frequency detection module includes a Hall sensor which is configured to sense the magnetic field generated by the inductance coil.

In a preferred embodiment, the bridge circuit is a half-bridge circuit composed of a first transistor and a second transistor.

In a preferred embodiment, the bridge circuit is a full-bridge circuit.

In a preferred embodiment, the first transistor and the second transistor are configured to be switched alternately according to a frequency of the PFM signal, thereby forming a forward process and a reverse process of the LC oscillator; wherein

- the forward process includes charging the capacitor and forming a forward current passing through the inductance coil; and the reverse process includes discharging the capacitor and forming a reverse current passing through the inductance coil.

In a preferred embodiment, the first transistor and the second transistor are configured to be switched when the voltage of the LC oscillator changes to 0V.

In a preferred embodiment, the PFM controller includes a MCU controller, a pulse generator and a bridge circuit driver, wherein the MCU controller is configured to control the pulse generator to generate the PFM signal in PFM mode; and the bridge circuit driver is configured to drive the bridge circuit to turn on or off according to a frequency of the PFM signal.

In one embodiment, an oscillation frequency of the LC oscillator is ranged from 80 KHz to 400 KHz, more preferably from 200 KHz to 300 KHz.

In a preferred embodiment, the frequency detection module is configured to detect an oscillation frequency of the LC oscillator according to a time difference between two changes of a voltage value at a detectable position to a threshold.

In a preferred embodiment, the threshold is 0V;

and/or, the voltage detection unit includes a zero crossing comparator.

In a preferred embodiment, the frequency detection module includes:

a rectifier diode D, whose input end is connected to a detectable position of the LC oscillator;

the frequency detection module further includes a current detection unit which is configured to detect a current at an output end of the rectifier diode, and the frequency detection module deduces the oscillation frequency of the LC oscillator according to the detection result of the current detection unit.

In a preferred embodiment, the current detection unit includes:

a first divider resistor, a second divider resistor and a second capacitor; wherein a first end of the first divider resistor is connected to an output end of the rectifier diode;

a first end of the second divider resistor is connected to a second end of the first divider resistor, and a second end of the second divider resistor is grounded; and the second capacitor is in parallel connection with the second divider resistor; wherein the current detection unit is configured to detect the current at the output end of the rectifier diode according to the voltage at two ends of the first divider resistor or the second divider resistor.

The present disclosure further provides a method for controlling an aerosol-producing device to heat a smokable material to generate an aerosol, the aerosol-producing device including:

an inductance coil, which is configured to generate a changing magnetic field;

a capacitor, which is configured to form an LC oscillator with the inductance coil; and a susceptor, which is configured to be penetrated by the changing magnetic field to generate heat, thereby heating the smokable material to generate an aerosol; wherein the method includes:

controlling a pulse generator to generate a PFM signal; and driving, through the PFM signal, the LC oscillator to oscillate at a variable frequency, thereby causing the inductance coil to generate a changing magnetic field supplied to the susceptor with a variable frequency.

By using the foregoing aerosol-producing device in the embodiment of the present disclosure, by means of the control mode of PFM inverter output, matching inverter output with a PFM signal may be flexibly performed according to the real-time situation of the heating status change and the needs of more different heating processes, and more heating efficiency requirements may be met while loss is reduced.

BRIEF DESCRIPTION OF THE DRAWINGS

One or more embodiments are illustrated through the image(s) in corresponding drawing(s). These illustrations do not form restrictions to the embodiments. Elements in the drawings with a same reference number are expressed as similar elements, and the images in the drawings do not form restrictions unless otherwise stated.

DETAILED DESCRIPTION

For a better understanding, the present disclosure is described below in further detail in conjunction with accompanying drawings and specific embodiments.

Figure 1:
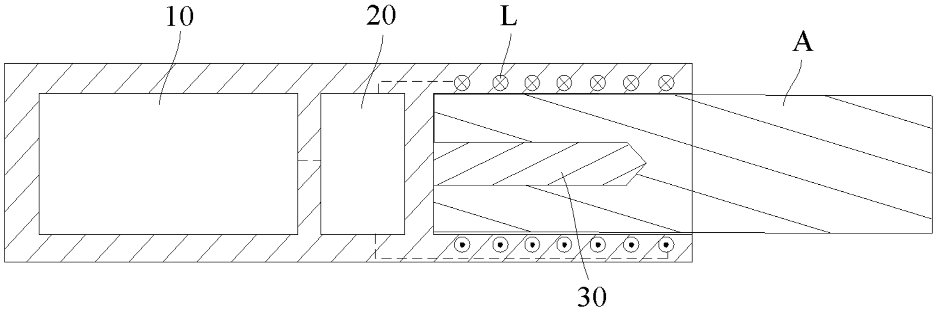
FIG. 1 is a structure diagram of an aerosol-producing device according to one embodiment.

One embodiment of the present disclosure provides an aerosol-producing device, whose structure can refer to FIG. 1, including:

a chamber, in which a smokable material A, for example, cigarette, is removably received;

an inductance coil L serving as a magnetic field generator, which is configured to generate an alternating magnetic field under an alternating current;

a susceptor 30, which extends at least in part in the chamber and is configured to be inductively coupled with the inductance coil L and to generate heat while being penetrated by the alternating magnetic field, thereby heating the smokable material A so that at least one composition of the smokable material A vaporizes to form an aerosol for inhalation;

a battery cell 10, which is a rechargeable Direct Current (DC) battery cell and can supply DC voltage and DC current; and a circuit 20, which is electrically connected to the rechargeable battery cell 10 and converts the DC output from the battery cell 10 into an Alternating Current (AC) with an appropriate frequency and then supplies it to the inductance coil L.

According to the usage setting of products, the inductance coil L may include a cylindrical inductor coil wound in a spiral shape, as shown in FIG. 1. The cylindrical inductance coil L wound in a spiral shape may have a radius ranged from about 5 mm to about 10 mm, in particular, the radius r may be about 7 mm. The cylindrical inductance coil L wound in a spiral shape may have a length ranged from about 8 mm to about 14 mm, and the inductance coil L has a number of windings ranged from about 8 windings to 15 windings. Correspondingly, the internal volume may be ranged from about 0.15 cm 3 to about 1.10 cm 3.

In a preferred embodiment, the frequency of the alternating current supplied by the circuit 20 to the inductance coil L is between 80 KHz and 400 KHz; more specifically, the frequency may be ranged from about 200 KHz to 300 KHz.

In a preferred embodiment, the DC supply voltage supplied by the battery cell 10 is ranged from about 2.5V to about 9.0V, and the amperage of the DC supplied by the battery cell 10 is ranged from about 2.5 A to about 20 A.

In a preferred embodiment, the susceptor 30 shown in FIG. 1, inserted into the smokable material A to heat the smokable material and presenting a sheet or pin shape, may have a length of about 12 mm, a width of about 4 mm and a thickness of about 50 μm, and can be made of Grade 430 stainless steel (SS430). As an alternative embodiment, the susceptor 30 may have a length of about 12 mm, a width of about 5 mm and a thickness of about 50 μm, and can be made of Grade 430 stainless steel (SS430). In another preferred embodiment, the susceptor 30*a* can also be constructed as a cylindrical shape. During usage, the internal space is used for receiving the smokable material A and heating the periphery of the smokable material A to generate an aerosol for inhalation. These susceptors 30 can also be made of Grade 420 stainless steel (SS420) and alloy materials containing iron and nickel (for example, permalloy).

Figure 2:
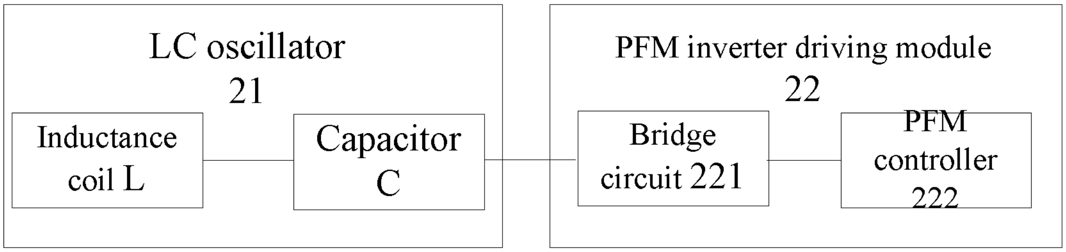
FIG. 2 is a block diagram of a circuit of an aerosol-producing device according to one embodiment.
Figure 3:
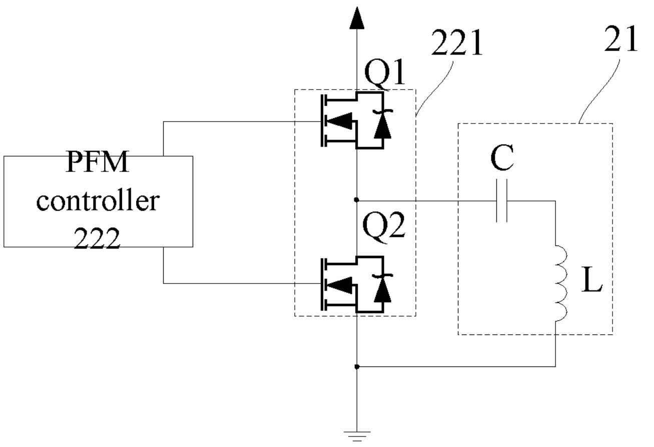
FIG. 3 illustrates one embodiment of a basic element of the circuit shown in FIG. 2.

Based on the implementation of electromagnetic induction heating, the above circuit 20 may refer to FIG. 2 to FIG. 3 for its structure and basic elements in one preferred embodiment, including:

a capacitor C, which is configured to form an LC oscillator 21 with an inductance coil L, generate an alternating current through the mode of LC oscillation and supply it to the inductance coil L, so that the inductance coil L generates an alternating magnetic field to induce the susceptor 30 to generate heat. Specifically, in an example shown in FIG. 3, the capacitor C and the inductance coil L are in series connection; however, in other variant embodiments, the LC oscillator 21 can also be formed by a parallel connection of the capacitor C and the inductance coil L.

Specifically, in embodiments shown in FIG. 2 to FIG. 3, the circuit 20 further includes a PFM (Pulse Frequency Modulation) inverter driving module 22, which is configured to drive the LC oscillator 21 to oscillate through PFM inverter. Specifically, the PFM inverter driving module 22 includes:

a bridge circuit 221, which is coupled to the LC oscillator 21; and a PFM controller 222, which is configured to output a PFM signal to the bridge circuit 221, thereby driving the LC oscillator 21 to oscillate and generate an alternating current supplied to the inductance coil L.

During implementation, the bridge circuit 221 may employ a half-bridge circuit including two transistor switches shown in FIG. 3; or, in other implementations, a full-bridge circuit having the same function may also be employed. In the embodiment of the present disclosure, the half-bridge shown in FIG. 3 is taken as an example to illustrate, including:

a half-bridge circuit 221, which, according to a PFM signal transmitted by the PFM controller 222, is configured to supply the DC voltage output from the battery cell 10 to the L oscillator 21 in a pulse mode so as to drive the LC oscillator 21 to oscillate, thereby forming an alternating current passing through the inductance coil L. Specifically, as shown in FIG. 3, the half-bridge circuit 221 is composed of a first transistor Q1 and a second transistor Q2; the PFM controller 222 controls the first transistor Q1 and the transistor Q2 to turn on alternately at a frequency according to the PFM signal, thereby supplying a pulse voltage.

Further, as for connection, the first transistor Q1 and the transistor Q2 are described taking a N-MOS tube for example; a gate electrode of the first transistor Q1 is connected to a first signal output end of the PFM controller 222, a drain electrode is connected to a voltage output end of the battery cell 10, and a source electrode is connected to the LC oscillator 21. A gate electrode of the second transistor Q2 is connected to a second signal output end of the PFM controller 222, to receive a second drive signal; a drain electrode is connected to the LC oscillator 21, and a source electrode is grounded. During the half-bridge driving process, the first transistor Q1 and the transistor Q2 turn on alternately according to the frequency of the PFM signal respectively, so that the current direction of the LC oscillator 21 changes alternately according to the frequency of the PFM signal, thereby generating oscillation to form an alternating current.

During usage, the inherent resonance frequency of the LC oscillator 21 will change with the temperature of the susceptor 30, resulting in large loss; specifically, the calculation formula for the resonance frequency of the LC oscillator 21 is $f=1/2\pi(L_t C)^{1/2}$, where $L_t$ represents an inductance value of an iron core coil composed of the susceptor 30 and the inductance coil L, and C represents a capacitance value of the capacitor C. For a given electronic device, the capacitance value basically keeps constant during working, thus the frequency f basically depends on the change of $L_t$.

The calculation formula for the inductance of the iron core coil is: $L_t=L+L_s$, where L is the inductance value of the inductance coil L, $L_s$ is the real-time inductance of the susceptor 30 serving as the iron core during the working state; during implementation, the inductance value of the inductance coil L basically keeps constant, while the real-time inductance $L_s$ of the susceptor 30 is varying. Further, according to foundations of physics, the calculation of the real-time inductance $L_s$ mainly depends on physical parameters including the air-gap length between the susceptor 30 and the inductance coil L (which could generate leakage inductance), the number of windings of the coil, the length of magnetic circuit, the sectional area of the susceptor 30 serving as the iron core, and the relative magnetic permeability $\mu_r$ of the susceptor 30. For a given aerosol-producing device, the real-time inductance $L_s$ of the susceptor 30 basically depends on the change of the variable of relative magnetic permeability $\mu_r$.

Figure 4:
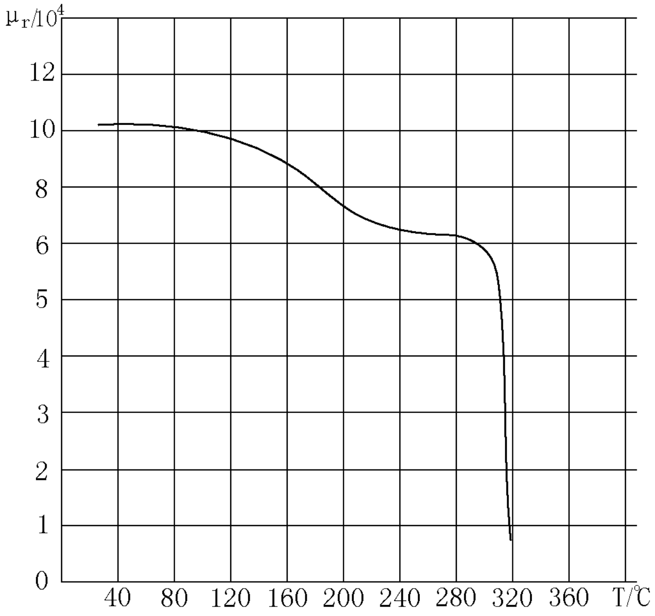
FIG. 4 is a curve of the relative magnetic permeability of a susceptor changing with temperature according to one embodiment.

Further, according to foundations of physics, the relative magnetic permeability $\mu_r$ of the susceptor 30 has a relationship with temperature. As an example, FIG. 4 shows a curve of the relative magnetic permeability $\mu_r$ of a susceptor 30, made of a standard permalloy 1J66, changing with temperature. Physical parameters which can represent or can be related to the change, for example, include a temperature coefficient of magnetic permeability $\alpha_\mu$ or magnetic susceptibility $\chi$. Specifically, the calculation formula for the temperature coefficient of magnetic permeability $\alpha_\mu$ is $\alpha_\mu=(\mu_{r2}-\mu_{r1})/\mu_{r1}(T_2-T_1)$, where $\mu_{r1}$ is a magnetic permeability at temperature $T_1$, $\mu_{r2}$ is a magnetic permeability at temperature $T_2$, and it is often used for expressing the relative change of the magnetic permeability when the temperature changes in the range of $T_1$ to $T_2$. Another example, the correlation formula for the magnetic susceptibility $\chi$ and the relative magnetic permeability $\mu_r$ of the susceptor 30 is $\mu r=1+\chi$. According to the Curie-Weiss law, the magnetic susceptibility $\chi$ of the susceptor 30 made of a ferromagnetic material has an inverse relationship with temperature, that is, during working, the relative magnetic permeability $\mu_r$ keeps changing under the influence of the temperature of the susceptor 30.

Of course, besides the above main factor of temperature, what is to affect the LC resonance frequency further includes some minor factors, for example, the load change of the entire circuit, the change of the LC frequency selection loop, and the change of parameters of internal relevant elements due to external supply voltage and humidity and the like In one embodiment, the PFM inverter driving module 22 can generate a PFM signal according to a suitable oscillation frequency of the LC oscillator 21 that is estimated from a predetermined heating temperature curve, so that the frequency to drive the LC oscillator 21 is close to the most suitable oscillation frequency, thereby keeping the oscillation process of the LC oscillator 21 close to complete resonance.

In another embodiment, other than the above one to make frequencies close to each other to reduce loss, by adjusting the PFM frequency modulation of the PFM inverter driving module 22, a variable frequency power can be formed and supplied to the susceptor 30. Through the output of variable frequency power, the circuit 20 can run under a low load state, further, the temperature rise and fall rate of the susceptor 30 has a wider range to change during the heating process, thereby promoting rapid warming to shorten the preheating time of the aerosol-producing device during the heating process.

Or, in another embodiment, the PFM inverter driving module 22 can generate a PFM signal according to a real-time operating temperature of the susceptor 30 that is detected by a temperature sensor.

Or, in another embodiment, the PFM inverter driving module 22 can generate a PFM signal according to one of a relative magnetic permeability, a magnetic susceptibility, a real-time inductance value or a resonance frequency of the susceptor 30 that has a relationship with temperature.

Figure 5:
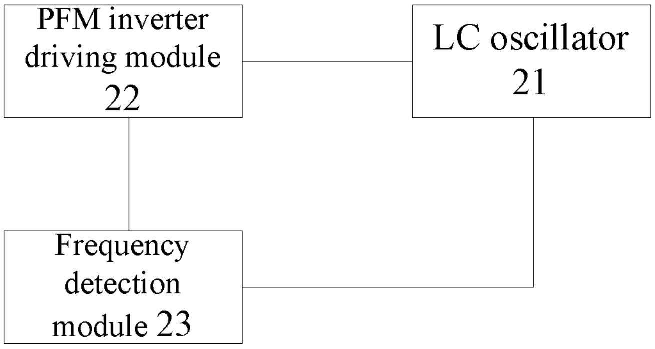
FIG. 5 is a block diagram of a circuit of an aerosol-producing device according to another embodiment.
Figure 6:
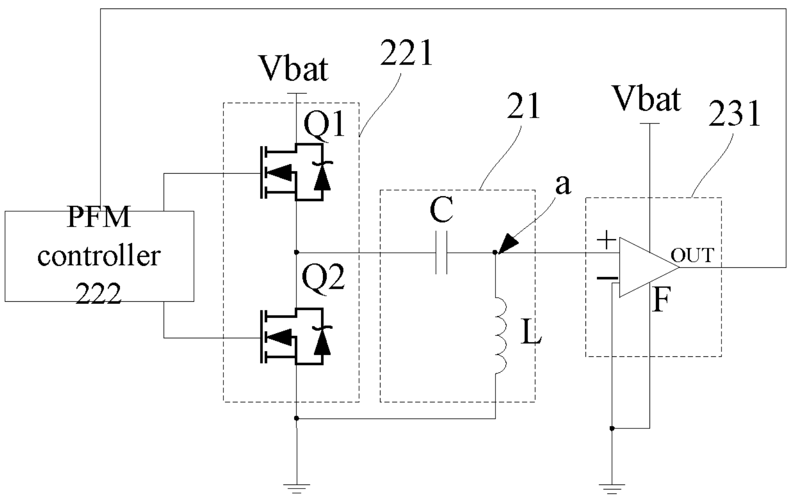
FIG. 6 illustrates one embodiment of a basic element of the circuit shown in FIG. 5.

Further, in one embodiment, the real-time oscillation frequency of the LC oscillator 21 can be detected, and the PFM inverter driving module 22 controls the generation of PFM signal according to the detected frequency; in the present embodiment, the structure of the circuit 20, referring to FIG. 5 and FIG. 6, may include a frequency detection module 23, which is configured to detect an oscillation frequency of the LC oscillator 21. In the embodiment shown in FIG. 6, the frequency detection module 23 employs a voltage detection unit 231 which is configured to detect the voltage value at a detectable position, for example, point a, between the capacitor C and the inductance coil L, thereby obtaining the working frequency of the LC oscillator 21 according to the detected voltage value at the point a.

Figure 7:
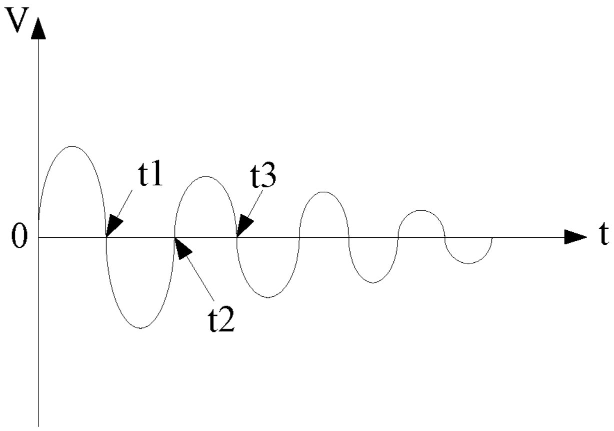
FIG. 7 is a representative oscillation waveform of voltage of an LC oscillator shown in FIG. 6

Further, specifically, in one embodiment, a zero crossing detection circuit of convenience is taken as the voltage detection unit 231 for exemplary illustration. The zero crossing detection circuit is a common circuit to detect the zero potential of the alternating current when the waveform converts from positive half-cycle to negative half-cycle. The oscillation frequency of the LC oscillator 21 has cyclicity. Of course, as the continuous discharge of the battery cell 10, the quantity of electric charge decreases continuously, the amplitude and frequency of the entire LC oscillator 21 has certain attenuation with time; in one embodiment, the potential of point a presents an oscillation waveform which has cyclicity and has attenuation with time as shown in FIG. 7. In FIG. 6, when the voltage detection unit 231 is implemented employing zero crossing detection, the difference between two adjacent time points t1 and t2 at which the point a has a zero potential is called a half oscillation cycle, then the cycle of the LC oscillator 21 is T=(t2−t1)×2, and the frequency is f=1/T. Then, the PFM controller 222 generates a PFM signal with the same or approaching frequency according to the detected frequency f, thereby adjusting the oscillation process of the LC oscillator 21 to basically tend to resonance.

For the convenience of complete implementation, the zero crossing detection circuit employed above may be implemented using a universal electronic device of zero crossing comparator, as shown in FIG. 6. In FIG. 6, to install and connect the zero crossing comparator F, a sampling input end "+" is connected to the point a of the LC oscillator 21, and a reference input end "−" is grounded, and a result output end "out" is connected to the PFM controller 222; then, the grounding voltage at the reference input end is 0; when the voltage value received at the sampling input end "+" is 0 too, a signal is output to the PFM controller 222. Thus, frequency detection is realized.

In another preferred embodiment, the first transistor Q1 and the second transistor Q2 are configured to be alternately switched when the zero crossing comparator F detects that the voltage or current of the LC oscillator 21 is 0V, which can effectively avoid the heat loss of the first transistor Q1 and the second transistor Q2.

Figure 8:
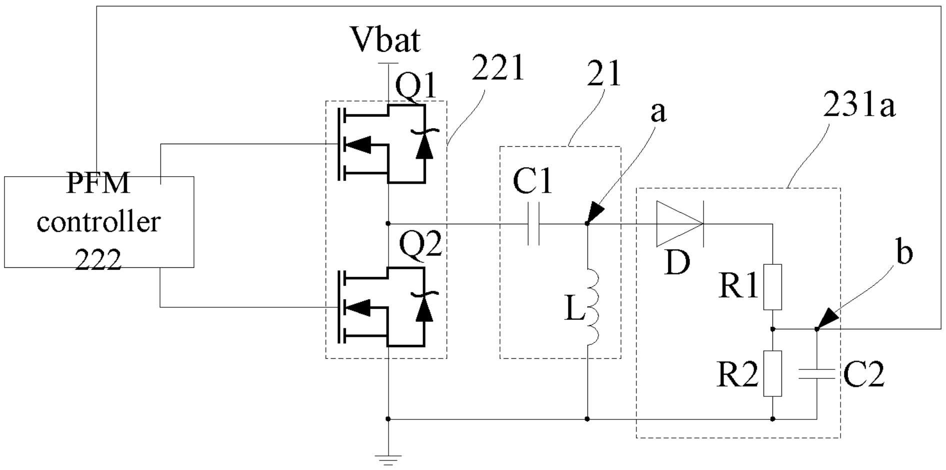
FIG. 8 illustrates another embodiment of a basic element of the circuit shown in FIG. 5.

In another embodiment, the frequency detection module 23 may be implemented employing an example of another voltage detection unit 231*a* shown in FIG. 8. The voltage detection unit 231*a* includes: a rectifier diode D, a first divider resistor R1 and a second divider resistor R2.

A first end of the rectifier diode D is connected to the point a between the capacitor C1 and the inductance coil L in the LC oscillator 21, and a second end is connected to a first end of the first divider resistor R1.

A second end of the first divider resistor R1 is connected to a first end of the second divider resistor R2.

A second end of the second divider resistor R2 is grounded.

The rectifier diode D filters and rectifies the alternating current of the LC oscillator 21 and then outputs it to a divider circuit composed of the first divider resistor R1 and the second divider resistor R2. Subsequently, the voltage at a point b between the first divider resistor R1 and the second divider resistor R2, that is, the voltage to ground at two ends of the second divider resistor R2, can be received through a pin of the PFM controller 222.

Of course, since the point a outputs an alternating positive-negative current, and the rectifier diode D can only rectify the current within the positive half-cycle or negative half-cycle (in FIG. 8, the direction of the diode takes the positive half-cycle rectification for example), it is a DC voltage with a pulse that is applied to the divider circuit composed of the first divider resistor R1 and the second divider resistor R2 after rectification, then the voltage signal detected at the point b is a pulse signal and the accuracy is affected. Therefore, in order to detect a persistent voltage signal at point b, the voltage detection unit 231*a* further includes a second capacitor C2 in parallel connection with the divider resistor R2. The second capacitor C2 is configured to filter the pulse voltage at two ends of the divider resistor R2 into a DC voltage for the convenience of persistent detection.

Of course, during implementation if the employed PFM controller 222 does not have a voltage detection pin, an ammeter device capable of measuring the voltage at point b can be added between the point b and the PFM controller 222.

Using the above voltage detection unit 231*a*, a sine wave is output from the point a of the LC oscillator 21, and the since wave, after being rectified, is output to the divider circuit having two divider resistors; a DC sampling voltage of sine wave is obtained at the point b, and the sampling voltage changes with different frequencies of the LC oscillator 21 and is fed back to the PFM controller 222. In such way, the working frequency of the LC oscillator 21 can be known, thus the PFM controller 222 can adjust the frequency to generate the PFM signal, thereby finally ensuring the LC oscillator 21 to be always close to complete resonance.

Or, in another embodiment, a Hall sensor can be employed to detect variable parameters of an alternating magnetic field generated by the oscillation of the LC oscillator 21, such as frequency, cyclicity and so on, and then the PFM inverter driving module 22 can generate a PFM signal according to the variable parameters of the alternating magnetic field detected by the Hall sensor.

Figure 9:
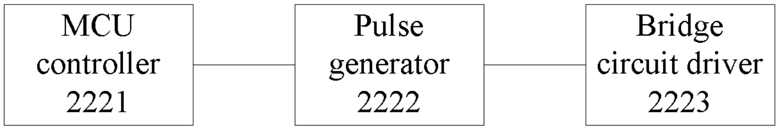
FIG. 9 is a block diagram of one embodiment of a PFM inverter driving module shown in FIG. 2.

In an embodiment shown in FIG. 9, the PFM controller 222 is a constructed integrated circuit, which in hardware composition may include an MCU controller 2221, a pulse generator 2222 based on PFM mode, and a universal electronic device of bridge circuit driver 2223, wherein the pulse generator 2222 is configured to generate a PFM signal in PFM mode according to a control signal transmitted by the MCU controller 2221; of course, the control signal transmitted by the MCU controller 2221 mainly includes parameters to generate a PFM signal, such as a modulation frequency and a duty ratio.

The bridge circuit driver 2223 is configured to drive, according to the PFM signal, the transistors in the bridge circuit 221 to turn on alternately according to a frequency of the PFM signal, so that the LC oscillator 21 oscillates.

Figure 10:
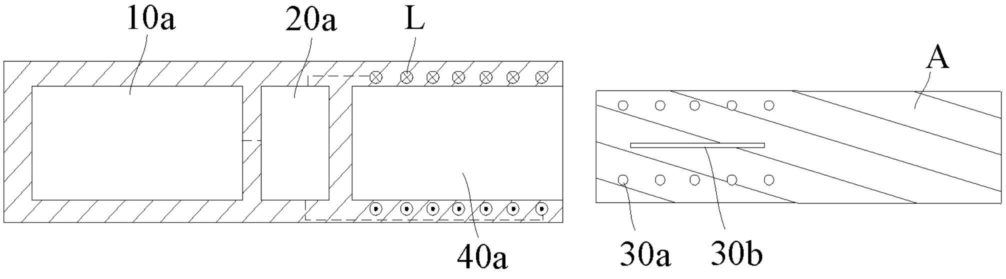
FIG. 10 is a structure diagram of an aerosol-producing device according to another embodiment.

Another embodiment of the present disclosure provides an aerosol-producing device, whose structure is as shown in FIG. 10, including:

- a chamber 40*a*, in which a smokable material A is removably received;
- an inductance coil L, which is configured to generate a changing magnetic field under an alternating current;
- a battery cell 10*a*, which is a rechargeable Direct Current (DC) battery cell and can output a DC current;
- a circuit 20*a*, which is electrically connected to the rechargeable battery cell 10*a* and converts the DC output from the battery cell 10*a* into an Alternating Current (AC) with an appropriate frequency and then supplies it to the inductance coil L.

When the smokable material A used together with the aerosol-producing device is being prepared, its interior is built with or doped with a susceptor member 30*a*/30*b*. During implementation, the susceptor 30*a* may present particles 30*a* evenly distributed inside the smokable material A or present a needle or pin or sheet shape 30*b* extending along an axial direction of the smokable material A. In the present embodiment, the aerosol-producing device itself does not include a susceptor that is electromagnetically coupled with the inductance coil L to generate heat, and the susceptor member 30*a*/30*b* is arranged inside the smokable material A. When the smokable material A is received inside the chamber 40*a*, the susceptor member 30*a*/30*b* is penetrated by the alternating magnetic field generated by the inductance coil L to generated heat, thereby heating the smokable material A to generate an aerosol for inhalation.

One embodiment of the present disclosure further provides a control method for an aerosol-producing device, wherein the structure and implementation of the aerosol-producing device can refer to the above description; the method includes the steps of: controlling a pulse generator 222 to generate a PFM signal in PFM mode; and driving, according to the PFM signal, the LC oscillator 21 to oscillate at a variable frequency and generate an alternating current supplied to the inductance coil L.

It is to be noted that the description of the present disclosure and the drawings just list preferred embodiments of the present disclosure and are not limited to the embodiments described herein. Further, for the ordinary staff in this field, multiple improvements or variations may be made according to the above description, and these improvements or variations are intended to be included within the scope of protection of the claims appended hereinafter.

What is claimed is:

1. An aerosol-producing device, configured to heat a smokable material to generate an aerosol, comprising:

- a chamber, which is configured to receive at least part of a smokable material;
- an inductance coil, which is configured to generate a changing magnetic field;
- a capacitor, which is configured to form an LC oscillator with the inductance coil;
- a susceptor, which is configured to be penetrated by the changing magnetic field to generate heat, thereby heating the smokable material to generate an aerosol;
- a PFM inverter driving module, which is constructed as an integrated circuit and comprises:
- a bridge circuit, which is coupled to the LC oscillator;
- a PFM controller, which is configured to output a PFM signal to the bridge circuit to drive the LC oscillator to oscillate at a variable frequency, thereby causing the inductance coil to generate the changing magnetic field; and
- a frequency detection module, which is configured to detect an oscillation frequency of the LC oscillator, wherein the PFM controller is configured to output a PFM signal to the bridge circuit according to a detection result of the frequency detection module;
- wherein the frequency detection module is configured to detect an oscillation frequency of the LC oscillator by monitoring a change of voltage or current of the LC oscillator, or
- wherein the frequency detection module is configured to detect an oscillation frequency of the LC oscillator by monitoring a change of the magnetic field generated by the inductance coil in the LC oscillator.

2. The aerosol-producing device according to claim 1, wherein the PFM controller is configured to output a PFM signal to the bridge circuit according to a predetermined temperature.

3. The aerosol-producing device according to claim 1, further comprising a temperature sensor, which is configured to sense an operating temperature of the susceptor, wherein the PFM controller is configured to output a PFM signal to the bridge circuit according to the operating temperature of the susceptor.

4. The aerosol-producing device according to claim 1, wherein the PFM controller is configured to output a PFM signal to the bridge circuit according to at least one of a relative magnetic permeability, a magnetic susceptibility or a real-time inductance value of the susceptor.

5. The aerosol-producing device according to claim 1, wherein the PFM controller is configured to output a PFM signal to the bridge circuit according to a resonance frequency of the LC oscillator.

6. The aerosol-producing device according to claim 5, wherein the resonance frequency of the LC oscillator is determined according to the following formula:

$f=1/2\pi(LIC)^{1/2}$, where f represents the resonance frequency of the LC oscillator, $L_I$ represents an inductance value of the inductance coil comprising the susceptor, and C represents a capacitance value of the capacitor.

7. The aerosol-producing device according to claim 1, wherein the bridge circuit is a half-bridge circuit comprising a first transistor and a second transistor.

8. The aerosol-producing device according to claim 7, wherein the first transistor and the second transistor are configured to be switched alternately according to a frequency of the PFM signal, thereby forming a forward process and a reverse process of the LC oscillator; wherein the forward process comprises charging the capacitor and forming a forward current passing through the inductance coil; and the reverse process comprises discharging the capacitor and forming a reverse current passing through the inductance coil.

9. The aerosol-producing device according to claim 8, wherein the first transistor and the second transistor are configured to be switched when the voltage of the LC oscillator changes to 0V.

10. The aerosol-producing device according to claim 1, wherein the PFM controller comprises a MCU controller, a pulse generator and a bridge circuit driver, wherein the MCU controller is configured to control the pulse generator to generate the PFM signal in PFM mode; and the bridge circuit driver is configured to drive the bridge circuit to turn on or off according to a frequency of the PFM signal.

* * * * *